United States Patent [19]

Hull et al.

[11] Patent Number: 4,489,470
[45] Date of Patent: Dec. 25, 1984

[54] REFRIGERATION APPARATUS AND METHOD OF MAKING SAME

[75] Inventors: Warren L. Hull, Avon; Wesley C. Leedahl, St. Cloud; Donald R. Notch, Kimball, all of Minn.

[73] Assignee: White Consolidated Industries, Inc., Cleveland, Ohio

[21] Appl. No.: 342,903

[22] Filed: Jan. 26, 1982

[51] Int. Cl.³ .......................................... B23P 15/26
[52] U.S. Cl. .............................. 29/157.3 C; 228/183; 219/60.2; 29/157.4; 165/171
[58] Field of Search .................. 165/171; 29/157.3 C, 29/157.4, 157.3 R; 228/183; 219/59.1, 61, 60.2

[56] References Cited

U.S. PATENT DOCUMENTS

| | | | |
|---|---|---|---|
| 2,744,429 | 5/1956 | Seely | 72/367 |
| 2,912,230 | 11/1959 | Rataiczak | 165/171 |
| 3,193,659 | 7/1965 | Schaus | 29/157.3 C X |
| 3,357,083 | 12/1967 | Wiekn et al. | 228/183 |

FOREIGN PATENT DOCUMENTS 2301796 9/1976 France .................. 165/171

Primary Examiner—Howard N. Goldberg
Assistant Examiner—V. K. Rising
Attorney, Agent, or Firm—Pearne, Gordon, Sessions, McCoy, Granger & Tilberry

[57] ABSTRACT

A method of securing a tube, such as a condenser tube for a refrigeration cabinet, to the inside of the outer walls of the cabinet by means of direct welding between the tube and the oil panel of the cabinet. The tubing is formed to the desired configuration and a plurality of projections are formed on the tube for welding to the surface by a crimping action which indents the sidewalls of the tube at each weld location to produce a projection beyond the normal tubing wall while the rest of the tubing remains undeformed. Subsequently, the configuration of tubing is placed on the sheet and resistance-welded under conditions to produce a relatively light weld adhesion with a small weld nugget that does not create any significant discoloration or distortion on the other side of the sheet which becomes the finished exterior surface of the cabinet.

10 Claims, 10 Drawing Figures

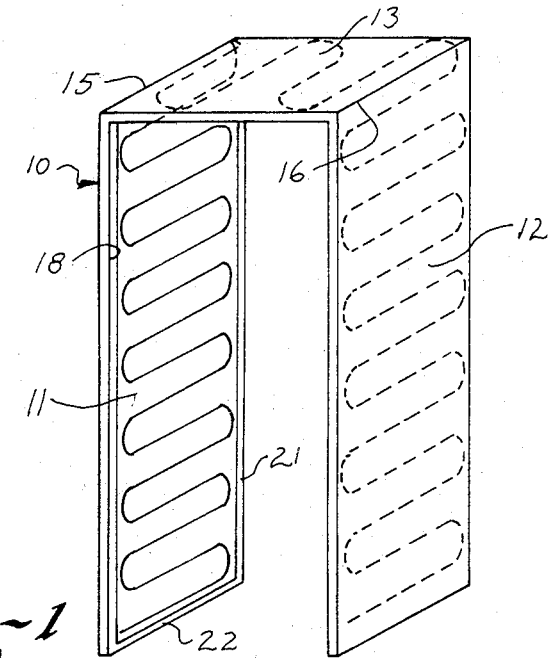
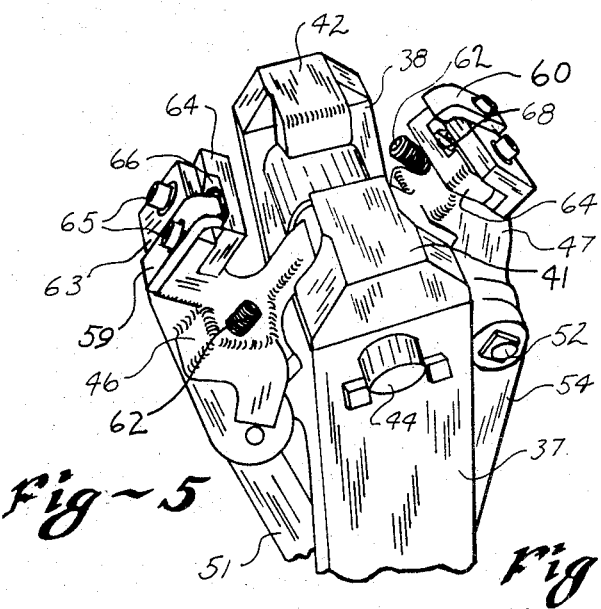
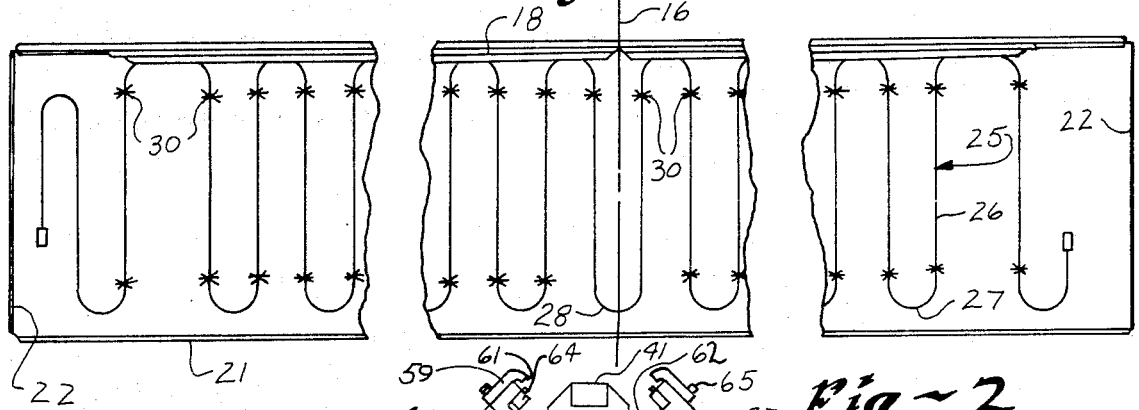
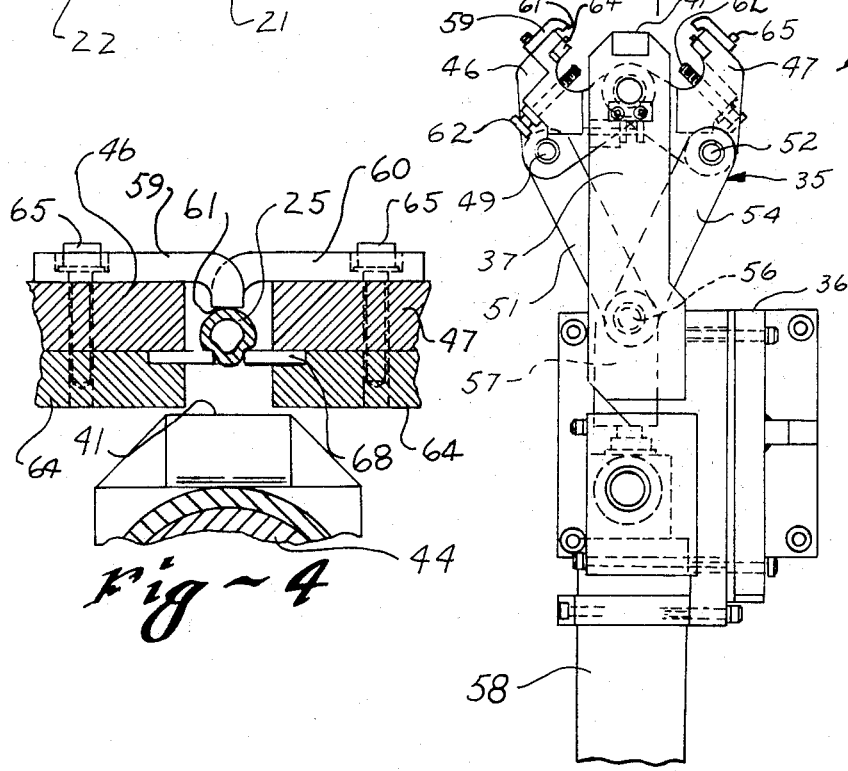

REFRIGERATION APPARATUS AND METHOD OF MAKING SAME

BACKGROUND OF THE INVENTION

This invention relates generally to food freezers and refrigerators and, more particularly, to the cabinets of such appliances in which either the evaporator or condenser coils, or both, are formed by attaching tubing directly to a sheet metal panel forming a portion of the cabinet.

In refrigerators and food freezers, the condenser unit is generally constructed in one of two ways. One way which is used when the refrigeration loads are quite high is to use an external condenser unit, generally mounted on the rear face of the cabinet, in which the tubing through which the refrigerant flows is connected to other metallic members, such as a grid of metal wires, and with fan-assisted air flow allows the heat to be radiated to the atmosphere. The other type of construction places the tubing directly on the inside of one or more of the exterior panels of the cabinet so that the exterior cabinet panel itself is heated above room temperature and the entire surface of the panel then acts as a radiator to remove the necessary heat from the system. In certain cases, such as chest-type food freezers with the opening in the top, a similar approach has been used also for the evaporator tubing, which is then attached to the exterior of the interior lining so that the entire interior wall becomes cold to absorb heat from the contents.

In the type of construction where the tubing is attached to a cabinet wall, there are a number of advantages and disadvantages compared to a separate condenser unit. When the tubing is attached directly to the interior side of the exterior walls, the extra expense of the nontubing portion of the separate condenser construction is eliminated. The absence of the separate condenser unit reduces the amount of cleaning and maintenance required. When the exterior panels are the heat radiating surfaces, they have a pleasant warmth to the touch, and by placing the tubing adjacent the door opening, where condensation from the atmosphere tends to collect, the need for separate heaters in this area is avoided. Thus, it has been recognized that by attaching the condenser tubing to the interior of the external cabinet wall, considerable cost savings are achieved, and, particularly if the attachment can be done in a low-cost and efficient manner, it does not destroy the exterior appearance of the panels and provides good heat conducting contact between the tubing and the panels.

Such arrangements have been shown in connection with freezers and refrigerators in a number of prior art patents, such as Pat. No. 2,622,753, which shows a chest-type food freezer in which the condenser coils are secured to the inner side of all four exterior wall panels and evaporator tubing is likewise attached to the exterior sides of the liner member with the insulation for the cabinet separating the evaporator and condenser tubing. A number of ways have been proposed for attaching the tubing to the panel, which particularly presents a problem because the metal of the panel is generally quite thin. This is especially true with foam insulation, where, because of the rigidity of the foam, the panels can be made substantially thinner than when a fiber glass type insulation is used which adds no stiffness to the cabinet structure.

One method that has long been used to attach the tubing is by means of metal straps that, in effect, clamp the tubing in place to the inside of the panel and, in turn, are welded to a surface of the panel, as shown in Pat. Nos. 1,987,422 and 3,150,796. This method has been successful because the straps or clamps can be held to the panel with a plurality of small welds that do not cause any substantial distortion or discoloration on the external surface of the panel, particularly when the straps or clamps are made of sheet steel substantially thinner than the material used for the cabinet wall. However, the placement of the tubing on the metal panel, the subsequent placing of the straps over the tubing, and the production of a number of individual spot welds still tend to result in a rather labor-intensive method of manufacturing, and if errors are made in the placement of the straps or the location of the welds, it may be difficult or impossible to maintain the tubing in proper contact with the metal panel for maximum heat transfer. This is particularly true with tubing which is assembled to a plurality of panels when they are in a flat or planar configuration, and after the tubing is attached they are bent to form a number of intersecting sides or top portions of the panel, since, on the bending of the sheet with the tubing attached, there may be some tendency for the tubing to pull away from the sheet in certain locations if the welds have not been properly made.

One approach that has been used to avoid this is to use a brazing or soldering type operation as shown in Pat. Nos. 2,691,813; 2,386,889; and 2,276,811. While each of these arrangements can produce a highly satisfactory article with excellent heat conducting contact between the tubing and the metal sheet, they are very expensive to make and require substantial capital investment in brazing ovens and other equipment, and lower temperature approaches such as soldering are simply not applicable when both the tubing and the panels are made of steel for purposes of maintaining cost at a minimum.

More recently, other arrangements have been proposed to use nonmetallic bonding or gluing materials, as shown in Pat. Nos. 2,795,035; 4,024,620; 3,904,721; and 3,966,283. Again, these approaches have not been competitive costwise with the use of metallic straps or clamps, in part because the adhesive or other material requires time to harden and reach full strength. Further, its presence directly between the tubing and the sheets tends to reduce heat conductance from the tubing to the metal panel.

Another approach that has been used has been to weld the tubing directly to the metal sheet by a form of electrical resistance welding. For example, evaporator tubing has been continuously welded to the outside of liners for chest-type food freezers, but such arrangement requires that the tubing be attached to the liner before it is completely formed in shape and requires a progressive weld as the tubing contacts the liner, which makes it extremely difficult to control and generally results in overheating the thin sheet metal panel portion to the point where the other or exposed side is deformed, leaving visible weld marks on the surface. Furthermore, particularly in the case of condenser tubing attached to several external panels of the cabinet such as the top and two adjacent sides, the most efficient arrangement is to apply the tubes in a serpentine configuration and any form of continuous welding requires extremely complex equipment and suffers from the same problem.

As a traveling welding head moves along the tubing and the adjacent panel, the exact points of conductance are hard to control, so that the welding tends to be nonuniform and overheating or burning occurs at various points, thereby damaging the exterior finish of the panels.

To avoid this problem, it has been proposed that such welding be done only at isolated points along the tubing. Such an arrangement has been proposed in Pat. No. 3,104,312, in which the tubing is formed with annular bulges or ridges extending around the periphery, and the welding is done only at those points. However, the forming of the annular rings or projections is extremely expensive, and must generally be done while the tubing is straight and before it is formed into the configuration for attachment to the panel. A similar approach is also shown in Pat. No. 3,193,659, wherein the projections are formed not by expanding the wall of the tubing but by deforming the portions between spaced projections which remain from the undeformed portion of the tubing. Again, the equipment to accomplish this would tend to prove quite expensive and inflexible for different arrangements.

Still another approach as disclosed in Pat. No. 3,926,358 has been to use ultrasonic welding at spaced locations instead of electrical resistance welding, but this still requires deforming the tubing out of the normal circular cross-sectional shape, and has not been practical using the standard steel sheets and tubing which represent the lowest cost materials available.

SUMMARY OF THE INVENTION

The present invention relates to a method of attaching tubing, such as the condenser tubing of a household refrigerator or freezer, to a sheet metal panel such as the walls of a refrigerator or freezer cabinet or liner. In a typical application of the invention, the two sidewalls and the top wall of a freezer cabinet are formed from a single sheet of steel, the edge portions being preformed while the sheet is flat so that the three wall portions still lie in a plane. The entire condenser tubing unit comprises a piece of tubing that has been cut to length and pre-bent into a serpentine configuration, with portions extending generally perpendicular to the edges of the cabinet from front to back, where they are joined by radius bends with the proper spacing so that the tubing assembly will substantially fill the surface of the two sidewalls and top wall. After the tubing, which is of usual circular cross section, has been formed to the shape in which it is to be attached to the sheet metal panel, it is deformed at predetermined locations by a pinching action, so that the sidewalls are bent out of the normally circular cross-sectional shape to form a projection extending outwardly from the remainder of the tube wall on the side adjacent the metal panel. The tubing assembly is then placed on the panel in the desired location, and clamped by welding heads which apply a clamping force plus a welding current for a predetermined time, to cause the projections on the tubing to adhere to and be welded to the surface of the panel.

The welding operation is carefully controlled with the proper pressure, welding current, and time, so that the tubing tends to be reformed back toward its original circular cross section, and the projecting bead pressed into the metal panel with a weld that causes sufficient adhesion to the surface of the panel, so that the entire condenser unit remains firmly attached to the panel throughout subsequent forming operations. However, the current is limited so that the weld may be formed at the contact between the projections on the tubing and the surface of the metal panel does not penetrate through the metal panel. Thus, the surface finish of the other side of the panel which forms the exposed surface of the cabinet is not damaged, and after the panel goes through a conventional finishing process, such as painting, the finish on the exterior surface of the panel will be of acceptable appliance industry quality. After the welding takes place, the panel with the attached condenser unit can then be bent at the predetermined fold points into a generally U-shaped configuration which forms the two sidewalls and top wall of the cabinet.

The projections on the tubing are formed by means of a pair of power-operated pinching jaws carrying contact elements of a predetermined configuration to provide a pair of matched indentations on opposite sides of the tubing. The indentations are produced on that portion of the wall of the tubing generally between the center line of the tube and the panel so that any corresponding upward projection on the side of the tubing opposite the panel is minimized. The projection itself occupies a minimum extent along the length of the tube so that the resultant weld is in the form of a circle or oval. The pressure applied during the welding should be sufficient so as to substantially collapse the projection to bring the remaining portion of the tubing more closely into contact with the metal panel to minimize the spacing therebetween to a space substantially less than the original height of the projection before welding.

These and other features of the invention will become apparent to those skilled in the art upon reading the following detailed description of the preferred embodiment of the invention, as shown in the accompanying drawings.

BRIEF DESCRIPTION OF THE DRAWINGS

FIG. 1 is a perspective view of a portion of an upright freezer cabinet showing the two sidewalls and top wall with the condenser tubing attached to the inner sides thereof;

FIG. 2 is a plan view, with parts broken away and prior to bending, of the panel forming the sides and top wall of the cabinet in FIG. 1, showing the points of attachment of the tubing to the panel;

FIG. 3 is an elevational view of a crimping unit for forming the projections on the tubing with the jaws in the open position;

FIG. 4 is an enlarged, fragmentary view, similar to FIG. 3, but showing the jaws in the closed position;

FIG. 5 is a perspective view of the crimping unit shown in FIGS. 3 and 4;

DETAILED DESCRIPTION OF THE PREFERRED EMBODIMENT

Figure 6:
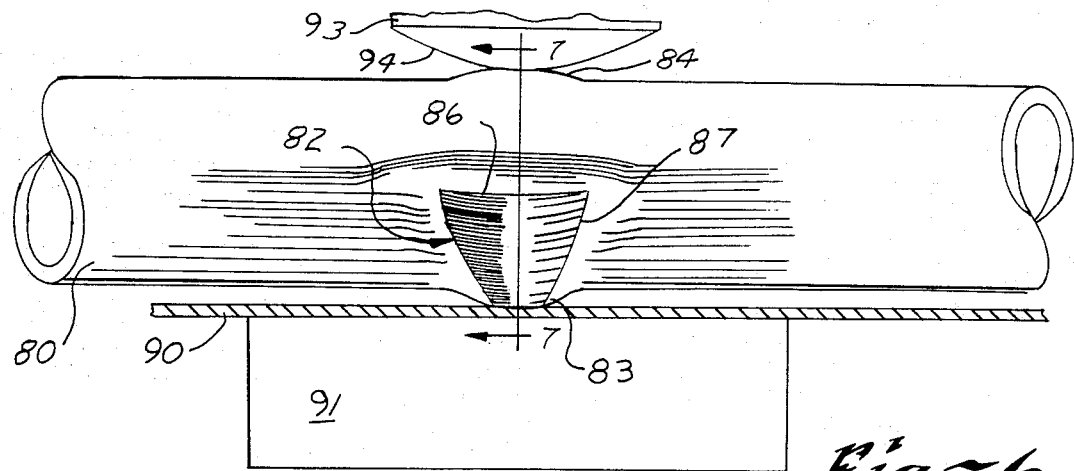
FIG. 6 is an enlarged, fragmentary view through a tubing projection in contact with the metal panel prior to welding.

Referring now to the drawings in greater detail, FIG. 1 shows a cabinet member 10 for an upright-type food freezer in which the left wall 11, right wall 12, and top wall 13 are all formed from a single sheet of steel. Thus, the left wall 11 and top wall 13 are joined along a fold 15 and the top wall 13 and right wall 12 are joined along another fold 16. This cabinet member is preferably made from a flat sheet of steel which passes through suitable operations for notching and blanking, as well as roll-forming, to form a front flange 18 extending along the front edge of the three walls and a rear flange 21 extending along the rear edge. Each of the left and right walls 11 and 12 terminates in a bottom flange 22 for stiffening purposes and for attachment to other parts of the cabinet.

The condenser tube 25 is formed from welded steel tubing which is first cut to the desired length and then bent into a serpentine pattern consisting of parallel reaches 26 joined by U-bends 27 and the condenser tube 25 is welded to the cabinet member 10 before folding at weld locations 30, as indicated in FIG. 2. It should be noted that the U-bends 27 adjacent the front flange 18 extend beneath the flange to provide warming around the door opening, and it should be noted that the front flange 18 is relatively heavy in construction to form a support frame around the interior liner and to provide suitable stiffness for supporting the door. It should also be noted that the condenser tube 25 is placed on the cabinet member 10 at such a location that U-bends 28 adjacent the folds 15 and 16 are bisected by the fold lines so that after the condenser tube has been welded in place, the left and right walls 11 and 12 are bent through a 90-degree bend each so that the resultant member has the appearance shown in FIG. 1. No welding of the tubing takes place at the bends 28 adjacent the folds so that the tubing at that point is given only a relatively gradual bend so as not to cause any collapse of the tube wall, which would create an undesirable restriction to the flow of refrigerant through the condenser tube. As shown in FIG. 2, it has been found desirable to weld the condenser tube 25 at locations 30 which are spaced at each end of the parallel reaches 26 adjacent the U-bends 27, and these weld locations constitute the sole means of attachment of the condenser tube to the metal cabinet panel 10.

In manufacture of the complete cabinet member 10, as previously stated, a sheet of steel is formed with the walls 11, 12, and 13 in a plane and with the flanges 18, 21, and 22 already formed in place. The condenser tube 25, having previously been bent into its serpentine configuration but with all of the tubing lying in a plane, is then deformed at each of the weld locations 30 in the manner discussed in greater detail hereinafter, so that at each of the weld locations the tubing is deformed out of its circular cross section to have a projection in contact with the metal sheet. With the condenser tube 25 firmly clamped in position on the metal panel, a weld is performed at each of the locations 30 by means of suitable electrodes, and after the welding has been completed, the bending of the walls along the fold lines 15 and 16 is done and the cabinet is ready for further processing. The welds 30 are done in such a manner that no significant markings or discoloration appear on the exterior of the cabinet and the weld is sufficiently strong to hold the tubing in place during the forming operation and subsequently when the cabinet member 10 is incorporated into the completed freezer. With the condenser tube 25 extending over most of the surfaces of the two sidewalls and top wall, the heat of the hot refrigerant is transferred directly to these metal panels and then radiated into the atmosphere, and since the wall panels have a large area, the temperatures will not be excessive but merely warm to the touch, while providing adequate heat transfer to cool the refrigerant gases. It will be understood that the general configuration of the cabinet member 10, including the condenser tube 25, is well known in the art, and the invention herein is directed to the method of forming the projections on the tube and making the welds of the tubing to the cabinet member.

The deformation of the tubing to produce the projections at each of the weld locations is accomplished by a unit such as that shown in FIGS. 3-5. These figures show a typical crimping unit 35, and it will be understood that the apparatus provides a plurality of crimping units so that for purposes of speed of production either all of the projections on the entire condenser tube 25 can be accomplished at the same time or, alternatively, groups of projections can be produced in alternate rows, such as by forming all of the projections for the welds adjacent the front flange 18 at one time, after which the condenser tube 25 can be shifted laterally, following which the projections can be formed by a second operation of the crimping units to form the projections for the welds adjacent the rear flange 21. On the other hand, although it would be slow, it would be possible to position the condenser tube 25 in sequence using a single crimper unit to form all of the projections, since all of the projections are identical and are formed in the same manner. Therefore, the construction and operation of only a single crimper unit need be described in detail.

As shown in FIGS. 3-5, the crimping unit 35 includes a support frame 36 having a pair of front and rear arms 37 and 38 which extend upwardly and terminate at their upper ends in pads 41 and 42. At their upper ends, the arms 37 and 38 support a pivot pin 44 located below said pads 41 and 42 and on which are pivotally mounted a pair of jaws 46 and 47 for swinging movement to and from the tube in position on suitable supports (not shown) holding the tube above the pads 41 and 42. The left jaw 46 on its lower end is connected by a pin 49 to a downwardly extending link 51. Likewise, the right jaw 47 carries a pin 52 pivotally connected to another downwardly extending link 54. At their lower ends, the two links 51 and 54 are mounted on another pivot pin 56 which is carried by a yoke 57 on the end of the cylinder rod of an air cylinder 58. Thus, when air is admitted into the cylinder 58, the yoke 57 and pin 56, acting through links 51 and 54, cause the jaws 46 and 47 to pivot upwardly from the open position shown in FIG. 3 to the closed position shown in FIG. 4 to simultaneously crimp or pinch the tube in place above the pads 41 and 42. Each of the jaws 46 and 47 carries a stop screw 62 adapted to engage one or the other of the pads 41 and 42 to limit the travel of the jaws 46 and 47 to the closed position so as to give precise control over the amount of indentation of the tubing.

To mount the tool used for actually contacting and indenting the tube, each of the jaws 46 and 47 has a supporting ledge 63 on the lower side of which is mounted a clamp bar 64 held in place by bolts 65. The clamp bar 64, in turn, carries a recess 66 in which is mounted a punch insert 68 which is held rigidly in place by the clamping action of the bolts 65 and abuts against the conforming sides of the recess 66.

To ensure that the tube 25 is properly positioned when the two inserts 68 simultaneously strike the tube, hold-down clamps 59 and 60 are mounted on the jaws 46 and 47. Since the tube is impacted below the centerline, there is an upward force component tending to lift the tube, and this is opposed by the hold-down clamps, ensuring that the two inserts 68 contact the tube at the desired locations. As shown most clearly in FIGS. 4 and 5, these clamps are secured to the top surfaces of the jaws 46 and 47 by one of the clamp bar bolts 65, with one clamp 59 being carried on the front of the left jaw 46 and the other clamp 60 being carried on the rear of the right jaw 47. Each of the clamps has a clamping face 61 which engages the upper surface of the tube 25 when the jaws are in the closed position as shown in FIG. 4. Each of the clamping faces 61 extends along the axis of the tube, contacting the upper side of the tube only at a zone on one side of the inserts 68. Thus, clamp 59 supports the upper side of the tube adjacent pad 41, and clamp 60 supports the upper side of the tube adjacent pad 42.

Figure 10:
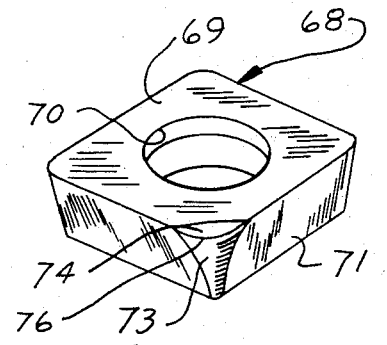
FIG. 10 is an enlarged, perspective view of the replaceable punch insert forming the indentation on the tubing showing the configuration thereof.

While the insert 68 may be of different shapes, it has been found practical to use a tungsten carbide insert of the type used as a cutting tool in lathes, and which may be modified to provide the precise shape of the punch to obtain the desired shape of the indentation in the tube. The insert is shown in greater detail in FIG. 10 in the form of a square piece of carbide having a flat top surface 69 and a central opening 70 which may be adapted to receive another mounting screw (not shown) to position the insert 68 in the recess 66. The sides 71 of the insert make an acute angle with the top surface 69 to provide the necessary clearance angle for the insert when used as a cutting tool. According to the preferred embodiment of this invention, the insert is mounted on the jaw so that the top surface 69 will be horizontal, and the top surfaces of the two opposed inserts will lie in the same plane, when the jaws are fully closed, with the stop screws 62 in engagement. When this is done, the insert 68 is provided with a rounded corner 73 which is ground on a radius following a line perpendicular to the top surface 69 so that the actual radius tapers toward the bottom because of the angle of the side surfaces 71. Furthermore, the top surface 69 may be ground away slightly as shown at 74 at an angle to the surface to define an edge 76 between the beveled surface 74 and the rounded surface 73.

Figure 7:
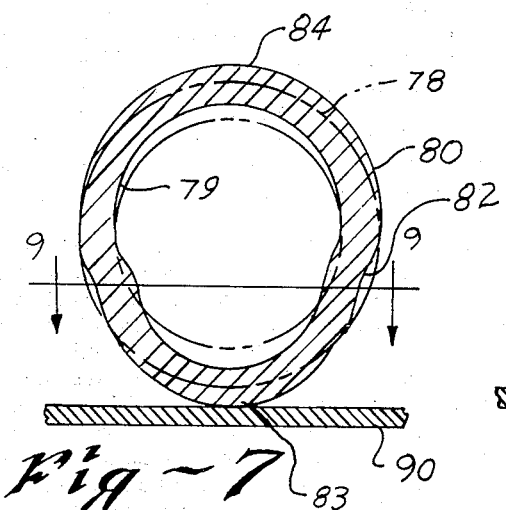
FIG. 7 is an enlarged, cross-sectional view through the tubing projection.
Figure 9:
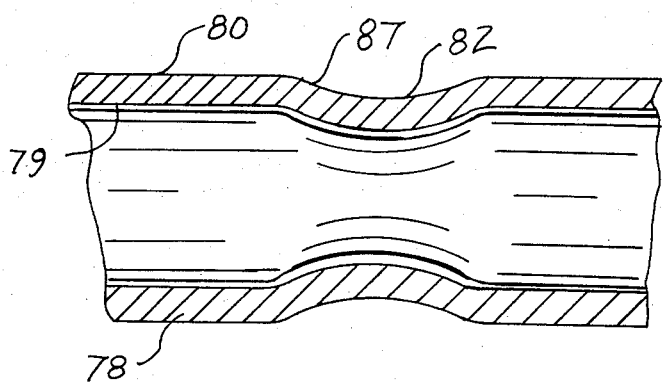
FIG. 9 is a fragmentary, cross-sectional view of the tube taken on the line 9—9 of FIG. 8.

The shape of indentation produced by the punch insert 68 does not conform exactly to the shape of the punch because of the resilient springback of the steel tubing after the insert has been withdrawn. The shape of the indentations and the projections formed thereby are best shown in FIGS. 6, 7, and 9. Before deformation, the tube wall 78 has a circular inner surface 79 and circular outer surface 80, the wall being of uniform thickness. After the operation by the crimping unit 35, a pair of dimples 82 are formed in lateral alignment on each side of the tube wall on the side of the centerline of the tube, which will be adjacent the metal sheet to which the tubing is to be welded. Because of the deformation of the tube by the dimples 82, there is formed a downward projection 83 which is at the actual point of weld to the metal sheet, but there also tends to be formed an upper projection 84 on the side of the tube away from the metal sheet. However, the downward projection 83 will be much greater in terms of the height of the projection above the surface of the tube than the upper projection 84 because of the location of the dimples 82 and the restraining action of the hold-down clamps 59 and 60. As best shown in FIG. 6, the dimple 82 has the point of greatest deformation along a line 86 which corresponds to the edge 76 on the punch insert 68. The dimple 82 is therefore somewhat triangular in shape and decreases in width and depth toward the projection 83 along tapering sides 87 to give the dimple an apparent triangular outline, as viewed from the side as shown in FIG. 6.

After all of the necessary projections 83 have been formed on the complete tubing, the entire condenser tube is placed on top of the metal sheet 90 forming the cabinet walls 11, 12, and 13, and the welding operation is then performed. The welding operation is done by the usual AC resistance welding, and the lower electrode 91 has a relatively large area to make contact with the underside of the metal sheet 90, it being understood that the underside will form the exposed outer surface of the cabinet 10 after assembly has been completed. It may also be understood that the lower electrode 91 may have a sufficient area in contact with sheet 90 as to have a single electrode underlie a plurality of welds so that the current density between the lower electrode 91 and the metal sheet is as low as possible to control and limit distortion of the lower side of the sheet 90. The upper electrode 93 is applied under the force of an air cylinder in the usual manner, and it should be noted that the upper electrode 93 has a rounded or spherical surface 94 so positioned as to make contact directly with the upper projection 84 and in line with the lower projection 83 on the tube. The use of the rounded surface 94 in effect concentrates the current flow so that it tends to lie in a plane containing the highest points of the upper and lower projections 83 and 84.

Figure 8:
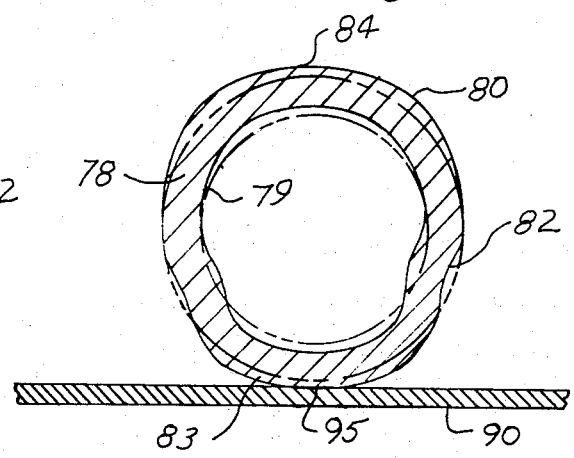
FIG. 8 is a view similar to FIG. 7 and showing the tubing and the panel after welding has taken place.

After the weld has been completed, as shown in FIG. 8, it will be found that the tubing in the area of the lower and upper projections 83 and 84 has been deformed so that the extent of the projections above the remainder of the surface of the tube has been substantially reduced. Furthermore, since the lower projection 83 is where the maximum heating occurs, the deformation at this point will be sufficiently great as to substantially collapse the entire height of the projection 83, tending to bring the outer surface 80 of tube wall 78 into close abutting contact with the metal sheet 90. However, even if that line contact does not occur and there is a slight spacing between the tube and the sheet in the areas between the welds, the use of thermal mastic applied to the joint between the tube and sheet prior to the introduction of foam insulation into the cabinet will assure proper heat transfer between the tube and the sheet.

In a typical application of this invention, the steel tube will have a nominal outside diameter of one-quarter inch and a wall thickness which may range between 0.028 and 0.033 inch. The tubing is normally made of a low carbon, cold finish steel which is butt-welded and drawn to finish diameter. Likewise, the metal sheets forming the cabinet are also of low carbon steel, and may have a thickness between 0.024 and 0.030 inch. After the operation of the crimping unit 35 and the formation of the dimples 82, the lower projection 83 will have a height as compared to the outside diameter of the tubing of approximately 0.008 to 0.015 inch, while the height of the upper projection 84 will be a maximum of one-half the height of the lower projection 83.

The welding is done with a resistance welding apparatus using a force of approximately 400 pounds on the upper electrode against the upper projection 84 and forcing the lower projection 83 against the sheet 90. Typically, the squeeze time is 99 cycles with the weld current applied for two cycles using the current of about 16,900 amps with a 65 percent heat setting. After the weld time, a hold time of 70 cycles is used for the nugget to harden.

After the weld has been completed, the tubing will tend to assume the configuration shown in FIG. 8, in which both the upper projection 84 and lower projection 83 have been substantially decreased in height by at least one-half of their former dimension so that the clearance between the tube outer surface 80 and sheet 90 is a maximum 0.008 inch, and preferably less than 0.005 inch. As can be seen in FIG. 8, the result of the weld is a very small nugget 95 generally confined to the surface of the sheet 90 ajacent the projection 83 and preferably not extending through more than one-half of the thickness of the sheet 90. When the weld nugget is so restricted in size, there will be substantially no deformation of the other surface of the sheet 90 as well as no heat discoloration which could adversely affect the finish of this side of the sheet. Such a weld has been found to have adequate strength to retain the tubing in place during the subsequent fabricating operations and after the entire cabinet has been formed and the foam insulation applied. The preferred method of testing the weld is by a destructive pull test in a direction perpendicular to the surface of the sheet 90. It has been found that as long as the weld holds with a pull strength of at least 85 pounds, the weld is of sufficient strength.

While it is understood that the assembly of the condenser tube 25 to the cabinet wall can be done by a number of welds, it has been found that a single weld using a projection of the type discussed above at the end of each straight reach 26 of the tube is sufficient and that no such welds need be applied adjacent the U-bend 28 at a fold. Of course, it is understood that when the invention is applied to other tubing configurations, welding at different points may be used as required by the particular application and configuration of the tube.

Although the preferred embodiment of this invention has been shown and described in detail, it should be understood that various other modifications and rearrangements of the parts may be made without departing from the scope of the invention as defined in the claims.

What is claimed is:

1. The method of securing a cylindrical metal tube to a metal sheet in tangential contact with said tube comprising inwardly deforming the tube wall by a pair of laterally opposed dimples to form a radially extending projection of the tube wall, placing the tube in tangential relationship with said sheet with said projection in surface-abutting contact with said sheet, clamping said tube to said sheet with welding electrodes positioned in alignment with said projection, applying a clamping force to said electrodes and applying a welding current to said electrodes to weld said projection to said sheet using a welding current and time sufficient to cause adhesion of said projection to the adjacent side of said sheet and without having the weld nugget extend to the other side of said sheet.

2. The method set forth in claim 1, wherein said tube wall and said sheet are substantially equal in thickness.

3. The method according to claim 1, wherein the outer surface of said tube other than at said projection is circular.

4. The method as set forth in claim 3, wherein said dimples are formed simultaneously by a crimping action.

5. A method according to claim 4, wherein said dimples are formed on the side of the centerline of the tube adjacent the sheet.

6. The method as set forth in claim 5, wherein said dimples are triangular in shape with the base of the triangle being away from said projection.

7. The method of manufacturing a heat exchange member of a refrigeration cabinet of the type having a sheet metal panel and a cylindrical metal tube secured thereto in heat-transferring relationship comprising forming the panel, forming the tube to have a predetermined configuration, deforming the tube wall at a plurality of axially spaced locations by constricting the sidewalls of the tube at a pair of laterally opposed indentations to form a projection at each location, placing the tube on said panel at a predetermined position with said projections in abutting contact with said panel, clamping said tube to said panel with welding electrodes positioned at said projections and applying a welding current to said electrodes to weld said projection to said panel using a welding current and time sufficient to cause adhesion of said projection to the adjacent side of said panel and without having the weld nugget extending to the other side of said panel.

8. The method as set forth in claim 7, wherein said panel has a planar configuration during said welding.

9. The method as set forth in claim 8, wherein said panel and tubing are subsequently folded to provide at least two intersecting wall surfaces of said cabinet and said tubing is welded to both of said wall surfaces.

10. The method as set forth in claim 9, wherein said wall surfaces are exterior surfaces of said cabinet and said tubing is on the inner side of said wall surfaces.

* * * * *